United States Patent [19]
Taylor

[11] Patent Number: 5,224,514
[45] Date of Patent: Jul. 6, 1993

[54] STORM DRAINAGE CONDUIT PLUG

[76] Inventor: James R. Taylor, 6875 Myakka Valley Trail, Sarasota, Fla. 34241

[21] Appl. No.: 750,817

[22] Filed: Aug. 27, 1991

[51] Int. Cl.[5] .................................................. F16L 55/10
[52] U.S. Cl. ........................................ 138/89; 4/295; 52/20; 404/25
[58] Field of Search .................. 138/89, 92; 52/20; 220/DIG. 19; 404/25; 4/295

[56] References Cited

U.S. PATENT DOCUMENTS

| | | | |
|---|---|---|---|
| 711,465 | 10/1902 | Bradshaw | 52/20 |
| 754,801 | 3/1904 | Pompoy | 52/20 |
| 950,270 | 2/1910 | Andrews | 52/20 |
| 951,192 | 3/1910 | Massey | 52/20 |
| 1,914,409 | 6/1933 | Draper | 220/357 |
| 2,446,661 | 8/1948 | Murdock | 4/295 |
| 2,543,839 | 3/1951 | Faris | 220/357 |
| 4,180,094 | 12/1979 | Virgh | 4/295 |
| 4,556,097 | 2/1985 | Burmeister | 220/DIG. 19 |
| 4,615,460 | 10/1986 | Buccellato et al. | 220/DIG. 19 |
| 4,726,707 | 2/1988 | Newton | 52/30 |
| 4,747,453 | 5/1988 | Howard | 52/20 |

FOREIGN PATENT DOCUMENTS

| | | | |
|---|---|---|---|
| 3831738 | 3/1990 | Fed. Rep. of Germany | 52/20 |
| 6937 | of 1888 | United Kingdom | 138/89 |

Primary Examiner—James E. Bryant, III
Attorney, Agent, or Firm—Charles J. Prescott

[57] ABSTRACT

A temporary reusable storm drainage conduit plug sized to slidably fit into the end opening of a length of tubular conduit situated within the ground. The device in use prevents dirt and debris from entering the open end of conduit already in place during storm drainage construction and is easily manually removable when the construction is ready to proceed further.

2 Claims, 2 Drawing Sheets

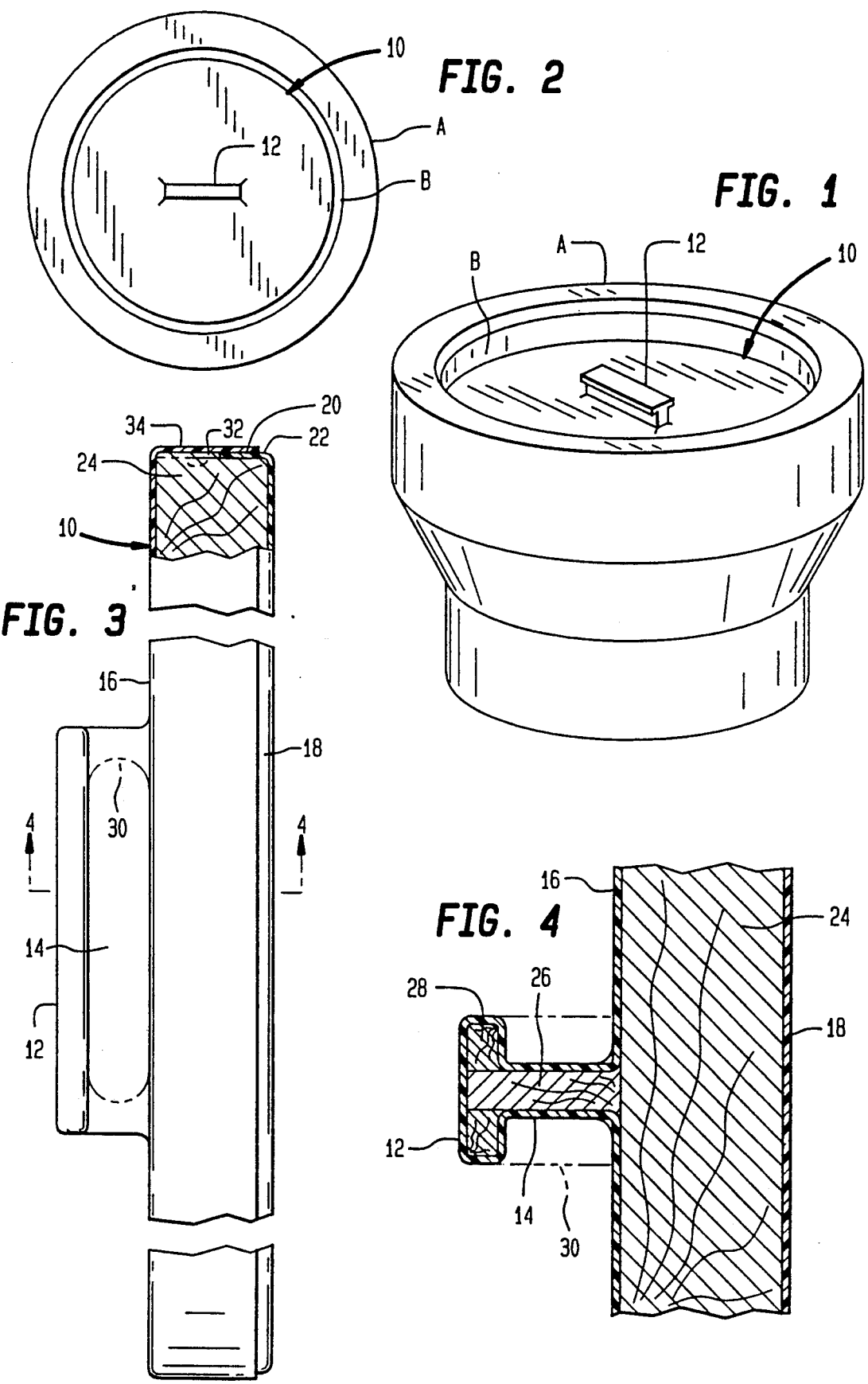

STORM DRAINAGE CONDUIT PLUG

BACKGROUND OF THE INVENTION

This invention is generally directed to means for sealing the end of pipes, and more particularly to a temporary reusable storm drainage conduit plug removably installable for preventing debris from entering these conduit systems when in place during construction.

During storm drainage system or sanitary sewer construction, sections of preformed reinforced concrete drainage conduit are laid in place and sealed end to end to ultimately form the completed drainage system. These lengths of conduit are typically fabricated of concrete and include end configurations which facilitate easy mating with the next successive conduit and are permanently sealable at or after installation.

At a point during the construction when the laying of conduit into a suitable trench and prepared bed must be temporarily interrupted, the open end of the last installed conduit is subject to being filled with dirt, debris and mud slurry. This can occur as a result of rain water filling the prepared trench or in situations where the conduit in place must be temporarily covered to allow interrupted traffic pattern to continue.

Additionally, when manholes of storm drainage systems are installed, the horizontal opening which, when completed, will receive a heavy steel manhole cover, or the lower manhole base thereof, is otherwise temporarily open and subject to a worker, debris or tools falling thereinto.

A conventional method of temporarily covering the ends of these conduits and manholes is to place a sheet of plywood over the opening. In covering a manhole having a horizontal opening, such a technique, although inconvenient, is somewhat practical despite the fact that the plywood is not cut to size. However, in situations where the conduit end will be temporarily buried, the contractor must anticipate the stabilizing of a larger sheet of plywood while it is temporarily covered with earth along with the conduit. Even where cut to size, the plywood is hard to handle and will rapidly deteriorate or be damaged.

Where the conduit ends are not so covered, sufficient debris has been known to enter the portion of the drainage system already in place in sufficient quantities so as to functionally obstruct future water flow, requiring its removal prior to continuing with the construction of the remaining conduit system.

BRIEF SUMMARY OF THE INVENTION

This invention is directed to a temporary reusable storm drainage conduit plug sized to slidably fit into the end opening of a length of tubular conduit situated within the ground. The device in use prevents dirt and debris from entering the open end of conduit already in place during storm drainage construction and is easily manually removable when the construction is ready to proceed further.

It is therefore an object of this invention to provide a temporary storm drainage plug which, when installed, will prevent debris, dirt and other objects from inadvertently entering the exposed end of a storm drainage conduit system during construction.

It is another object to provide the above invention as a highly durable and reusable device which is economical to manufacture and impervious to elements in the intended surroundings.

It is yet another object to provide the above invention utilizing vacuum forming manufacturing techniques to add strength and hermetic sealing against air and moisture from entering into the core of the device and the resulting warpage and deterioration associated therewith.

In accordance with these and other objects which will become apparent hereinafter, the instant invention will now be described with reference to the accompanying drawings.

BRIEF DESCRIPTION OF THE DRAWINGS

FIG. 1 is a perspective view of the belled end of a concrete storm drainage conduit fitting showing the invention in place.

FIG. 2 is a top plan view of FIG. 1.

FIG. 3 is a side elevation, partially broken view of the invention.

FIG. 4 is a partial section view in the direction of arrows 4—4 in FIG. 3.

DETAILED DESCRIPTION OF THE INVENTION

Figure 8:
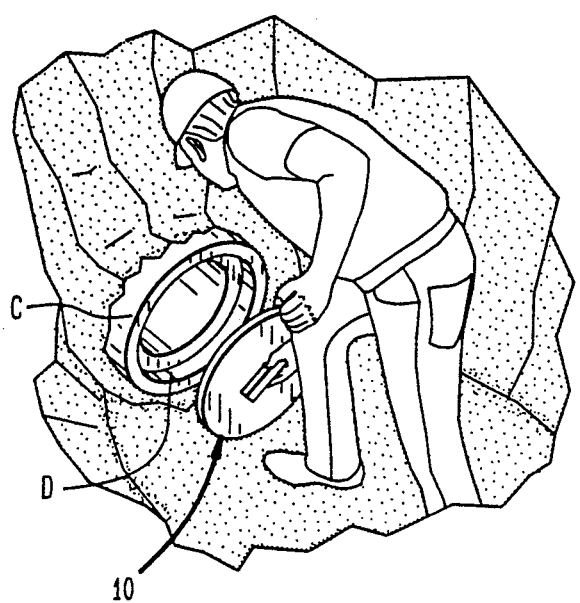
FIG. 8 is a perspective view of a worker removing the invention from the previously buried end of a storm drainage conduit system during construction.

Referring now to the drawings, and particularly to FIGS. 1 and 2, the invention is shown generally at numeral 10 positioned within the belled or enlarged end of a conventional circular reinforced concrete storm drainage conduit A. The inside diameter B of the belled or enlarged end is circular and is sized to receive the corresponding straight end of the next conduit section in sequence. The invention 10 is sized, utilizing handle 12, to be temporarily slid into inside diameter B which is shouldered to properly position the next conduit section later to be inserted thereinto.

Referring additionally to FIGS. 3 and 4, the plug 10 is manufactured having a disc-shaped inner wooden core 24 which is formed of a circular sheet of wooden sheet material, preferably plywood. Handle 12 is formed also having a wooden web 26 and flanges 28 laterally extending therefrom. An alternate embodiment of the handle 12 is shown in phantom at 30 provided to form pockets to assist in handling the disc 10.

Surrounding and encapsulating the wooden interior components is a layer of thin ABS plastic (approximately 1/16" thick) formed of two plastic halves 16 and 18. Vacuum forming techniques are the preferred method of applying the outer ABS plastic halves 16 and 18 so as to conformingly encapsulate the wood components. Plastic layer 16 is vacuum formed so as to also conformingly encapsulate the wooden components of handle 12. Plastic halves 16 and 18 overlap one another at 20 to form a generally cylindrical edge or perimeter 34.

Prior to vacuum forming of the plastic halves 16 and 18, all of the exposed wood surfaces are coated with a water-base sealant. Thereafter, the same surfaces are coated with a glue, after which vacuum forming proceeds. After the vacuum forming of plastic halves 16 and 18 is completed, a thin bead of PVC glue is applied around the perimeter at 22 so as to completely and hermetically seal the wooden components from air and moisture and to add strength to the overlapping seam.

Figure 5:
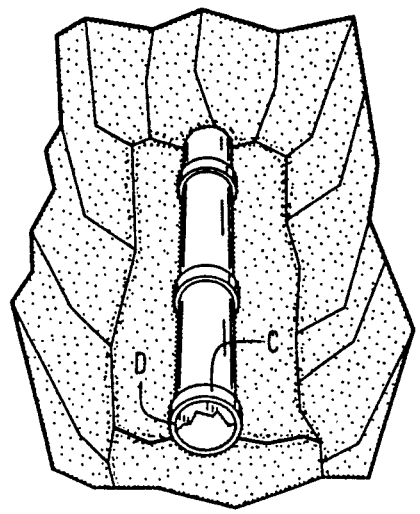
FIG. 5 is a perspective view of a storm drainage conduit system during construction.
Figure 6:
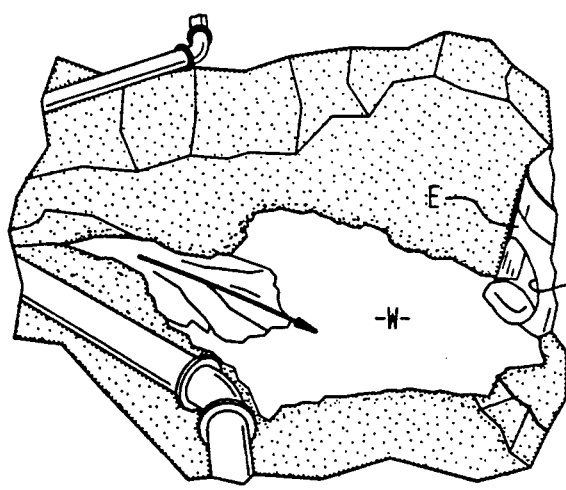
FIG. 6 is a perspective view of an upright storm drainage conduit fitting exposed to rainwater and mud accumulation at the opening.
Figure 7:
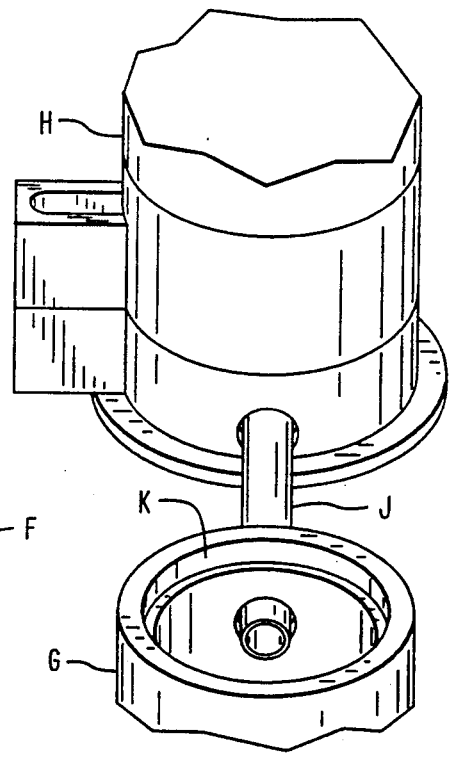
FIG. 7 is a perspective view of the opening of a lower base of a manhole.

FIGS. 5 to 7 depict the typical environment in which the present invention is intended for use. In FIG. 5, a section of storm drainage conduit is in the process of being laid within a prepared trench. The last segment C is shown having its exposed end D almost completely filled with surrounding earth. It is this condition which the present invention is intended to avoid so as to prevent this earth from collecting within the conduit section C. Otherwise, the conduit system, even when new, may become clogged and require cleaning.

In FIG. 6, another typical detrimental environment is there shown wherein rainwater W has collected within the excavation adjacent upright manhole E, leading to the slurry of earth and water entering into manhole opening F. In FIG. 7, the base portion G of an upright manhole is there shown and the invention is intended to be temporarily placed into circular sealing seat K. This manhole base G is connected via conduit J to manhole H as is typical in such installations.

Referring lastly to FIG. 8, a storm drainage conduit section C, having belled opening D has been previously installed and then temporarily buried to allow automobile traffic to continue. However, the earth has now been removed from around the belled end D of conduit C and the plug 10 is removed to allow for the continuing installation of the remainder of the storm drainage conduit. Note that virtually no surrounding dirt or debris has been allowed to enter into the interior of conduit C with the plug 10 having been put protectively in place.

Although all of the storm drainage conduits and manholes depicted in the figures have depicted circular openings into which a circular embodiment of the device is to be protectively installed on a temporary basis, the invention is also intended to be provided in oval, or elliptical or other like planar configurations so as to be protectively installed into the ends of that configuration of reinforced concrete conduit.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A temporary reusable storm drainage conduit plug comprising:

a rigid non-metallic flat plate forming an inner core;

a thin plastic layer closely conforming and adhered to, and encapsulating said plate and defining a perimeter lying in a plane of a predetermined size;

said perimeter structured to removably and slidably fit into a sealing seat formed into in situ tubular storm drainage conduit;

said core and said plastic layer cooperatively structured to remain undeformed within the end of the conduit in response to being covered with earth, said plug preventing earth from accumulating within the conduit;

a handle connected to and extending from one surface of said core;

said plastic layer formed of two mating plastic sheets vacuum formed over said core and sealingly overlapping one another along said perimeter;

one said plastic sheet also vacuum formed over said handle;

said core and said handle completely hermetically sealed from air and moisture by said overlapping plastic sheets.

2. A temporary reusable storm drainage conduit plug as set forth in claim 1, wherein:
   said core is made of wood.

* * * * *